US007058359B1

(12) United States Patent
Doyle et al.

(10) Patent No.: US 7,058,359 B1
(45) Date of Patent: Jun. 6, 2006

(54) LMDS SYSTEM WITH EQUAL POWER TO SUBSCRIBER LOCATIONS

(75) Inventors: Scott Bermingham Doyle, Sudbury, MA (US); Angelos Alexanian, Boston, MA (US); Charled Russell Wright, Winchester, MA (US)

(73) Assignee: The Whitaker Corporation, Wilmington, DE (US)

( * ) Notice: Subject to any disclaimer, the term of this patent is extended or adjusted under 35 U.S.C. 154(b) by 0 days.

(21) Appl. No.: 09/342,768

(22) Filed: Jun. 29, 1999

Related U.S. Application Data

(60) Provisional application No. 60/093,360, filed on Jul. 20, 1998.

(51) Int. Cl.
*H04B 1/00* (2006.01)

(52) U.S. Cl. ............... 455/63.1; 455/67.11; 455/115.1; 455/127.1; 455/562.1; 343/777; 343/907

(58) Field of Classification Search ................ 455/422, 455/446, 447, 448, 449, 134, 19, 20, 23, 455/3.05, 3.01, 3.02, 422.1, 426.2, 450, 454, 455/463, 11.1, 13.4, 42, 504, 522, 63.1
See application file for complete search history.

(56) References Cited

U.S. PATENT DOCUMENTS

| | | | | | |
|---|---|---|---|---|---|
| 4,249,181 | A | * | 2/1981 | Lee | 342/367 |
| 4,747,160 | A | | 5/1988 | Bossard | 455/33 |
| 5,771,449 | A | * | 6/1998 | Blasing et al. | 455/422 |
| 5,818,832 | A | * | 10/1998 | MaCallister | 370/350 |
| 5,872,547 | A | * | 2/1999 | Martek | 343/815 |
| 5,936,591 | A | * | 8/1999 | Yamasa et al. | 343/853 |
| 5,949,766 | A | * | 9/1999 | Ibanez-Meier et al. | 370/316 |
| 5,949,769 | A | * | 9/1999 | Davidson et al. | 370/329 |
| 5,991,345 | A | * | 11/1999 | Ramasastry | 375/347 |
| 6,047,177 | A | * | 4/2000 | Wickman | 455/422 |
| 6,052,582 | A | * | 4/2000 | Blasing et al. | 455/562.1 |
| 6,101,174 | A | * | 8/2000 | Langston | 370/312 |
| 6,104,935 | A | * | 8/2000 | Smith et al. | 455/562 |
| 6,308,080 | B1 | * | 10/2001 | Burt et al. | 455/522 |
| 6,473,616 | B1 | * | 10/2002 | Sydor | 455/446 |

* cited by examiner

*Primary Examiner*—Edward F. Urban
*Assistant Examiner*—Thuan Nguyen

(57) ABSTRACT

A local multipoint distribution service system having an antenna (1) for transmitting a signal of reused frequency within a specified range from the antenna (1), the antenna (1) having multiple radiating antenna elements, each of the antenna elements being adjusted in phase and in amplitude of radiated signal across the radiationg elements to mitigate radiation above the horizon, and each of the antenna elements being adjusted in phase and in amplitude of radiated signal therefrom to decrease attenuation in radiated power with distance from the antenna (1).

4 Claims, 9 Drawing Sheets

LMDS SYSTEM WITH EQUAL POWER TO SUBSCRIBER LOCATIONS

This application claims the benefit of U.S. Provisional Application No. 60/093,360, filed Jul. 20, 1998.

FIELD OF THE INVENTION

The invention relates to Local Multi-point Distribution Services, LMDS, of high-bandwidth, interactive broadband communications using a system of cell-site antennas transmitting wireless millimeter wave communications.

BACKGROUND OF THE INVENTION

A known system of cell-site LMDS antennas, described in U.S. Pat. No. 4,747,160, has omni-directional cell sites arranged in center-excited cellular patterns of a reused main signal to provide one-way broadband, television, TV, service using mm. wave carriers centered about 28 gHz. For example, 1 gHz. of bandwidth centered at 29 gHz. is allocated for TV service in New York City, N.Y. Antennas of transmitters serving the cell-sites are referred to as LMDS antennas. Subscribers to the service have high gain, narrow beam antenna-receiver units. The received signals are down-converted and cable linked to a set top receiver and encryption unit for viewing by the subscribers by way of their conventional analog TV receivers. Adjacent cell-sites avoid co-channel and adjacent channel interference by having a given channel assignment and polarization allocation of the main signal to achieve spectral efficiency and enable frequency reuse. The subscribers are partitioned within respective cell-sites, and assumes that each receiver site is served solely by one cell-site transmitter having an LMDS antenna that is geographically particular to the one cell-site in which the subscriber is located.

The known system is susceptible to fading of the carrier signals due to inclement weather precipitation, i.e. rain, and by propagation losses as a function of increasing distances from the transmitter along the signal path to each of the subscribers, referred to as path loss. The subscribers located along different lines of sight from the transmitter risk unacceptable signal attenuation as a result of their being located along nulls between lobes in the radiation pattern of signals from the LMDS antenna.

The known system assumes that an LMDS antenna provides line of sight propagation of the transmitted signals to multiple subscribers being serviced by a given cell-site. The location of the LMDS antenna is assumed to be located at the site of maximum elevation at the cell-site, to minimize the occasional occurrences of shadows in the propagated signal pattern imposed by geographically scattered vertical structures, such as tall buildings and tank towers within the cell-site. However, with the LMDS antenna being located at a relative maximum elevation, signal power of the transmitted signals that radiate above the horizon and into space is denied to the subscribers.

Accordingly, a millimeter wave communications system that uses LMDS antennas needs to provide a polar radiation pattern that substantially reduces the power of transmitted signals that radiate above the horizon, which maximizes the power of signals being radiated below the horizon to the subscriber locations. For effective power allocation to all subscriber locations at various ranges or distances from the LMDS antenna, it would be advantageous to counteract signal attenuation due to path loss. It would be advantageous to attenuate the signal at near range to take advantage of excess signal power available to near range subscribers, and to tailor the signal with lowered attenuation to supply adequate signal power to subscribers at the edge of the cell-site.

SUMMARY OF THE INVENTION

The invention relates to wireless distribution of broadband communications signals by LMDS antennas that counteract signal attenuation, due to the effects of path loss.

Further, the invention relates to wireless distribution of mm. wave, broadband communications signals by LMDS antennas that counteract signal attenuation, due to the effects of precipitation, i.e. rain.

Further, the invention relates to wireless distribution of broadband communications signals by LMDS antennas counteracting signal attenuation as an inverse relationship of $1/D^2$, where D is the Distance from the antenna to the subscriber location in the cell-site being served by signals transmitted by a corresponding antenna.

Further the invention provides broadband communications signals by having an optimum pattern of radiation that minimizes nulls between side lobes in the polar gain pattern of signal propagation from an LMDS antenna to mitigate zones of signal attenuation in the line of sight transmitted signal to subscribers coinciding with the nulls.

Further, the invention provides broadband communications signals by LMDS antennas that counteract signal attenuation due to path loss by attenuating the signal at near range to take advantage of excess signal power available to near range subscribers, and by tailoring the signal with lowered attenuation to supply adequate signal power to subscribers at the edge of the cell-site.

DESCRIPTION OF THE DRAWINGS

Embodiments of the invention will now be described by way of example with reference to the accompanying drawings, according to which.

DETAILED DESCRIPTION

Figure 2:
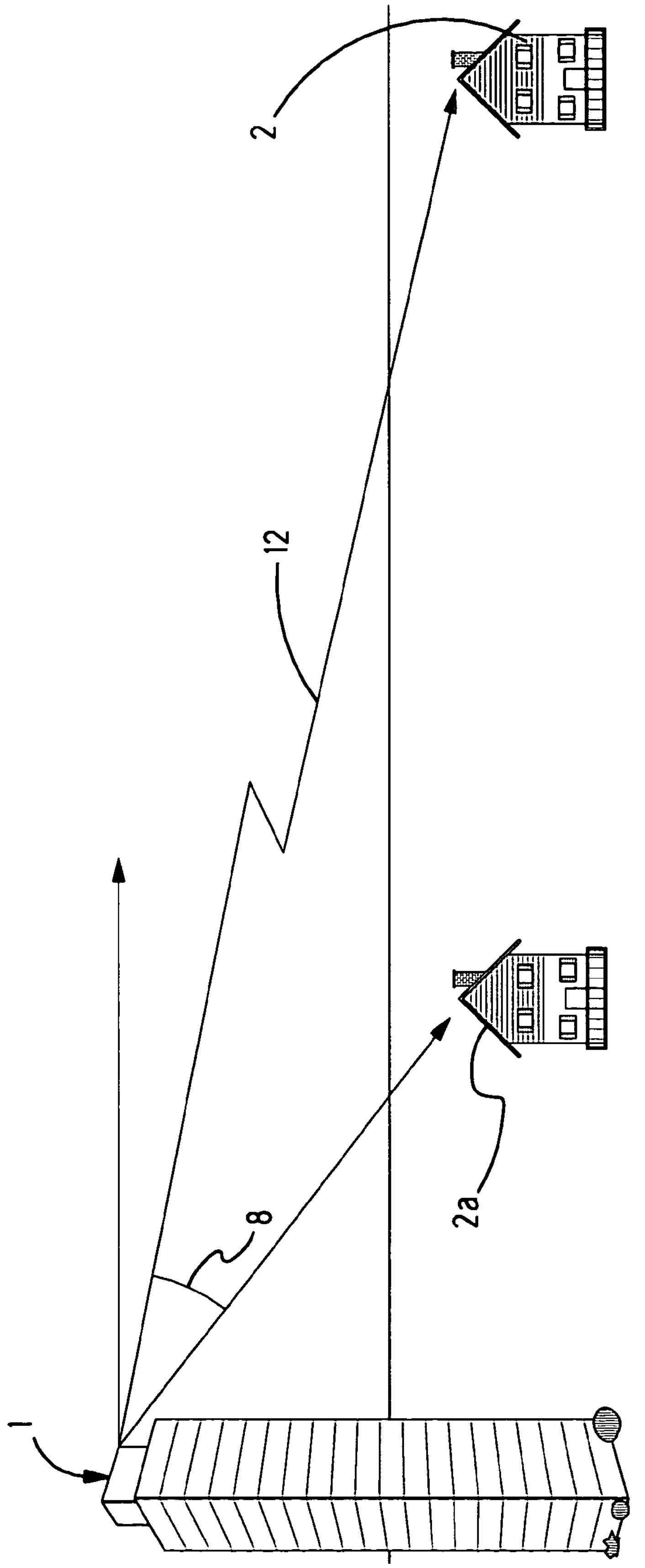
FIG. 2 is a diagram of subscribers within a cell-site being served by an LMDS antenna.
Figure 4:
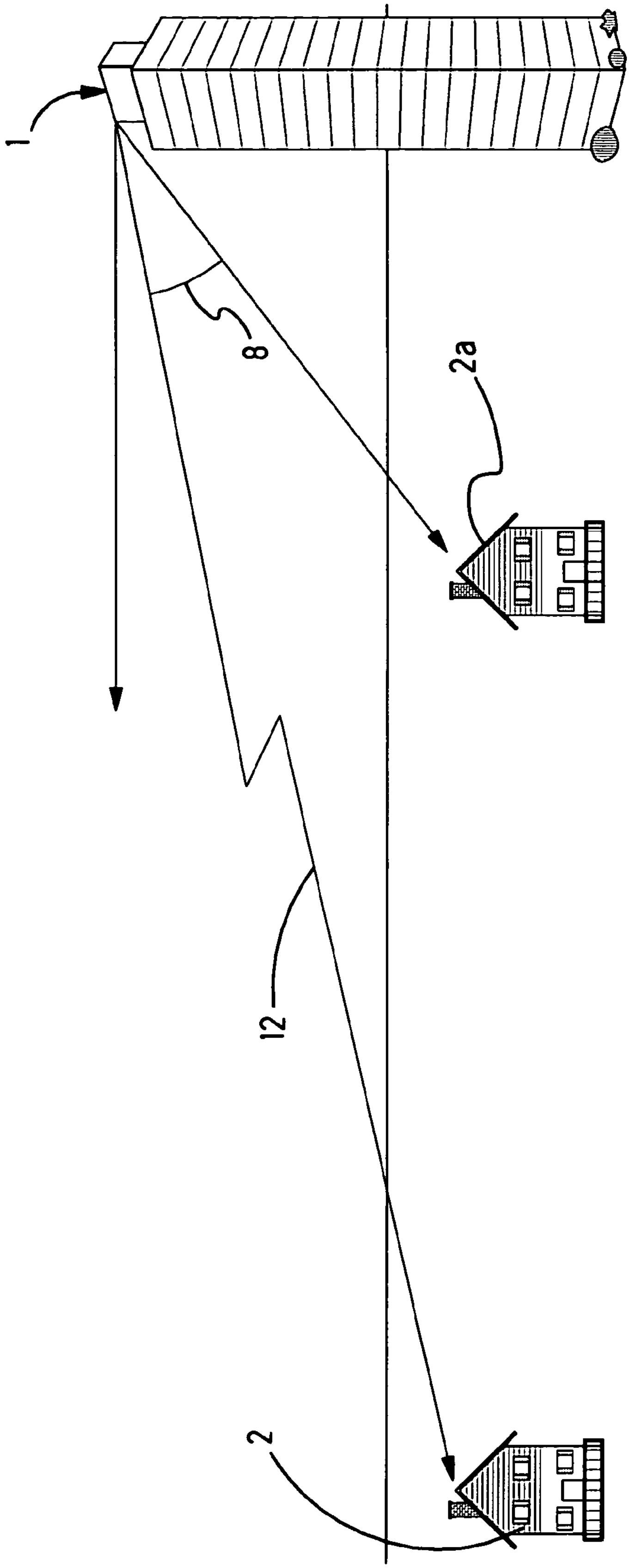
FIG. 4 is a diagram similar to that of FIG. 2.

With reference to FIGS. 2 and 4, a transmitter having a typical LMDS antenna 1 is located within an omni-directional cell site arranged in a center-excited cellular pattern of a mm. wave, reused main carrier signal to provide one-way television, TV, service. The mm. wave carrier, for example, is typically, 1 gHz. of bandwidth centered at 28 gHz. When a standard LMDS antenna is used at each cell-site, subscribers 2 at the edge of the cell-site receive a carrier of low power due to attenuation by path loss. Distribution of broadband communications signals by the LMDS antenna 1 attenuates by the relationship of $1/D^2$, where D is the Distance from the antenna to the subscriber location in the cell-site being served by the carrier signal. A subscriber 2*a* is shown at an intermediate range line of sight.

Figure 1:
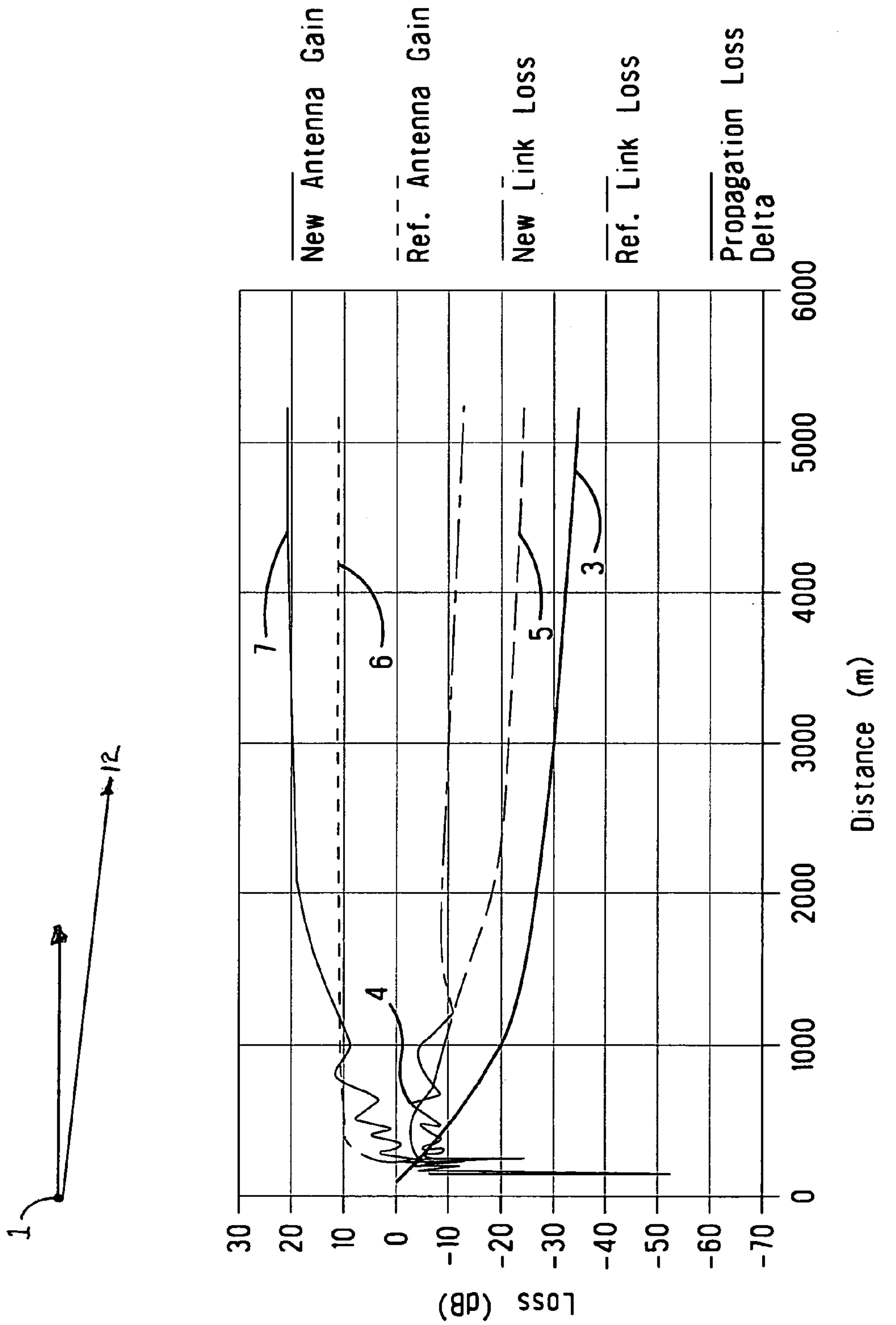
FIG. 1 is a graph of carrier signal loss in dB, decibels, versus distance in m, meters, to subscribers of the signal, as provided by a standard LMDS antenna, and by comparison, as provided by an optimum LMDS antenna, shown together with graphs of the antenna gain and link loss of both such LMDS antennas, and shown together with a graph of the known propagation loss delta due to the combined effects of path loss and rain.
Figure 1A:
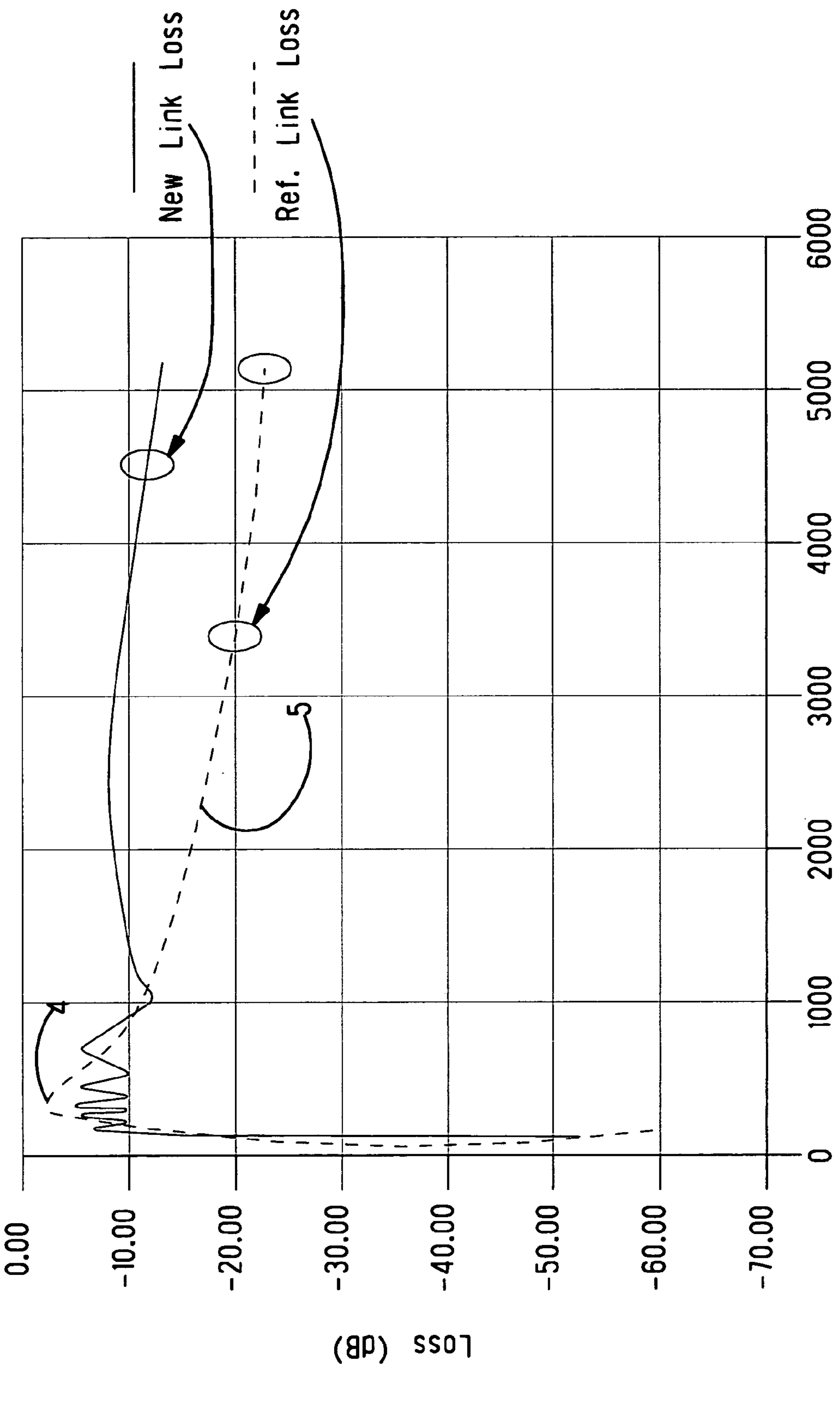
FIG. 1*a* is an enlarged view of a portion of the graph shown in FIG. 1.
Figure 3:
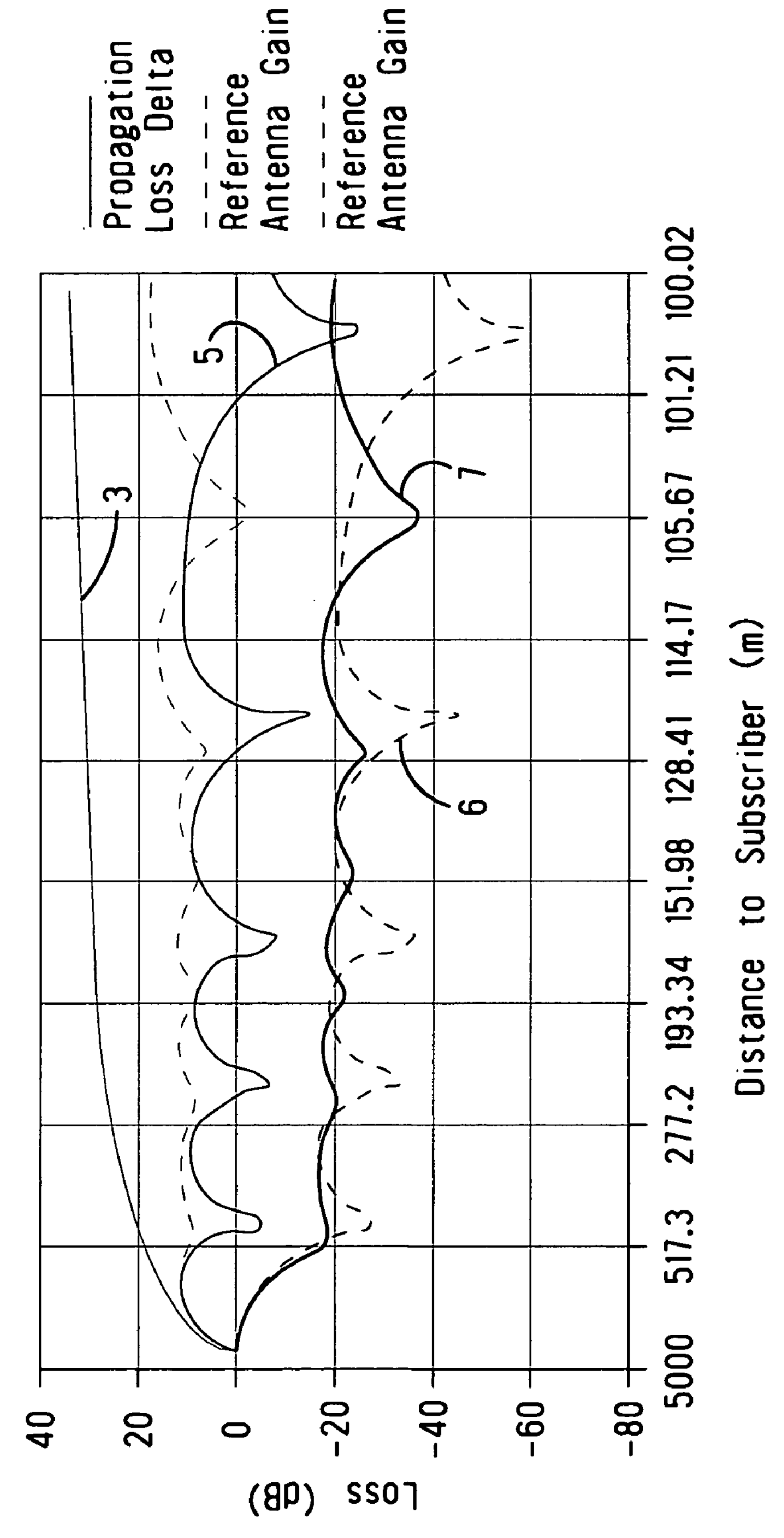
FIG. 3 is a graph similar to that of FIG. 3 and having a different scale of the distances to subscribers.

The invention recognizes that the polar gain profile of the signal being transmitted by a standard LMDS antenna, as shown as the Propagation Loss Delta curve 3, in FIGS. 1 and 3, is characterised by an excess peak power 4, FIG. 1*a*, close to the antenna 1, for example, within the first 1000 meters range or distance from the antenna 1. The excess peak power 4 close to the antenna is indicative of the available excess signal power, as compared to that required to support signal reception at an acceptable signal to noise ratio of a subscriber's receiver. From the excess peak power 4, the power declines with distance from the antenna due to path loss, as shown, in FIGS. 1, 1*a* and 2, by the link loss curve 5. The signals transmitted by the LMDS antenna attenuates by the relationship of $1/D^2$, where D is the distance from the antenna to the subscriber location in the cell-site being served by the carrier signal being transmitted by a corresponding antenna. The effects of atmospheric precipitation contributes to increasing the rate of attenuation, and its effects are included, as shown by the rate of attenuation that is present in the Propagation Loss Delta curve 3. With reference to the curve 3, the carrier signal attenuates with a typical −10.00 dB attenuation at just beyond 1,000 meters from the antenna. Well before reaching a range of 2,000 meters from the antenna, the polar gain profile recedes in value to indicate a typical −22.00 dB attenuation, which is known to be insufficient to support carrier signal reception at an acceptable carrier signal to noise ratio by a subscriber's receiver.

According to an aspect of the invention, the excess power, which is the power in excess of that needed to support signal reception at a range near the antenna, is, according to the invention, altered by providing an antenna gain at the near range with a higher attenuation to reduce the power profile to about a +10 dB gain. At farther ranges or distances from the antenna, the corresponding attenuation of the carrier signal is progressively lowered, so as to maintain a desired +10 dB gain over the extent of the range of carrier signal being supplied throughout the cell-site. Thus, as shown in FIG. 1, the Reference Antenna Gain curve 6 indicates an ideal, nearly constant, +10 dB gain, throughout the distance or range of transmission of the antenna to subscribers 2 and 2*a*, whether near or at the edge of the cell-site. To achieve the +10 dB gain throughout the cell-site, the antenna 1 is altered from the standard, by the number of radiating antenna elements of the antenna 1, and by the phase angle and amplitude of the signal across each of the antenna elements, as described hereafter, to provide the elevation gain pattern of the altered antenna 1 to closely match the expected path loss. The altered antenna 1 has its gain depicted as the New Antenna Gain curve 7, as shown in FIGS. 1 and 3. An antenna 1 having the new antenna gain as depicted in FIGS. 1 and 3, corresponds to the antenna 1 providing a carrier signal maintaining the desired +10 dB gain as received by the subscribers throughout the cell-site, and counteracting attenuation due to path loss and precipitation, i.e. rain.

When a standard LMDS antenna is used, the subscribers 2 and 2*a* risk being along lines of sight that coincide with nulls between lobes of the carrier signal pattern. The nulls present zones of signal power loss of inadequate link loss margin. According to the invention, nulls are minimized, so as to counteract low signal strength of the carrier coinciding with such nulls. According to the invention, the adjustment of the amplitude and the phase angle of the signal to each of the radiating antenna elements of the antenna 1 eliminates the depth of the nulls between side lobes of the antenna radiating pattern. This minimizes gain ripple as a function of angle off boresight 8, FIGS. 2 and 4, which is typically associated with the radiation pattern of a standard LMDS antenna.

Figure 5:
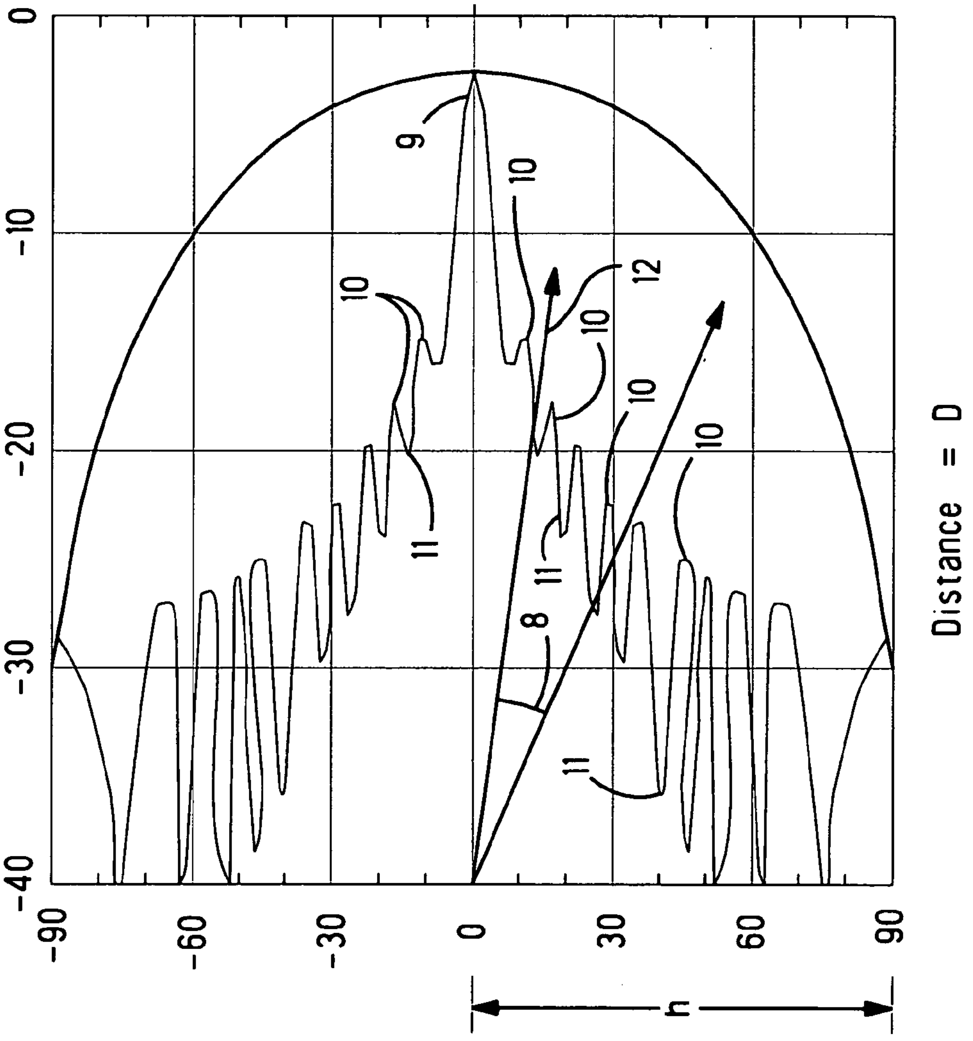
FIG. 5 is a graph of the polar gain pattern of a carrier signal transmitted by a standard LMDS antenna.
Figure 6:
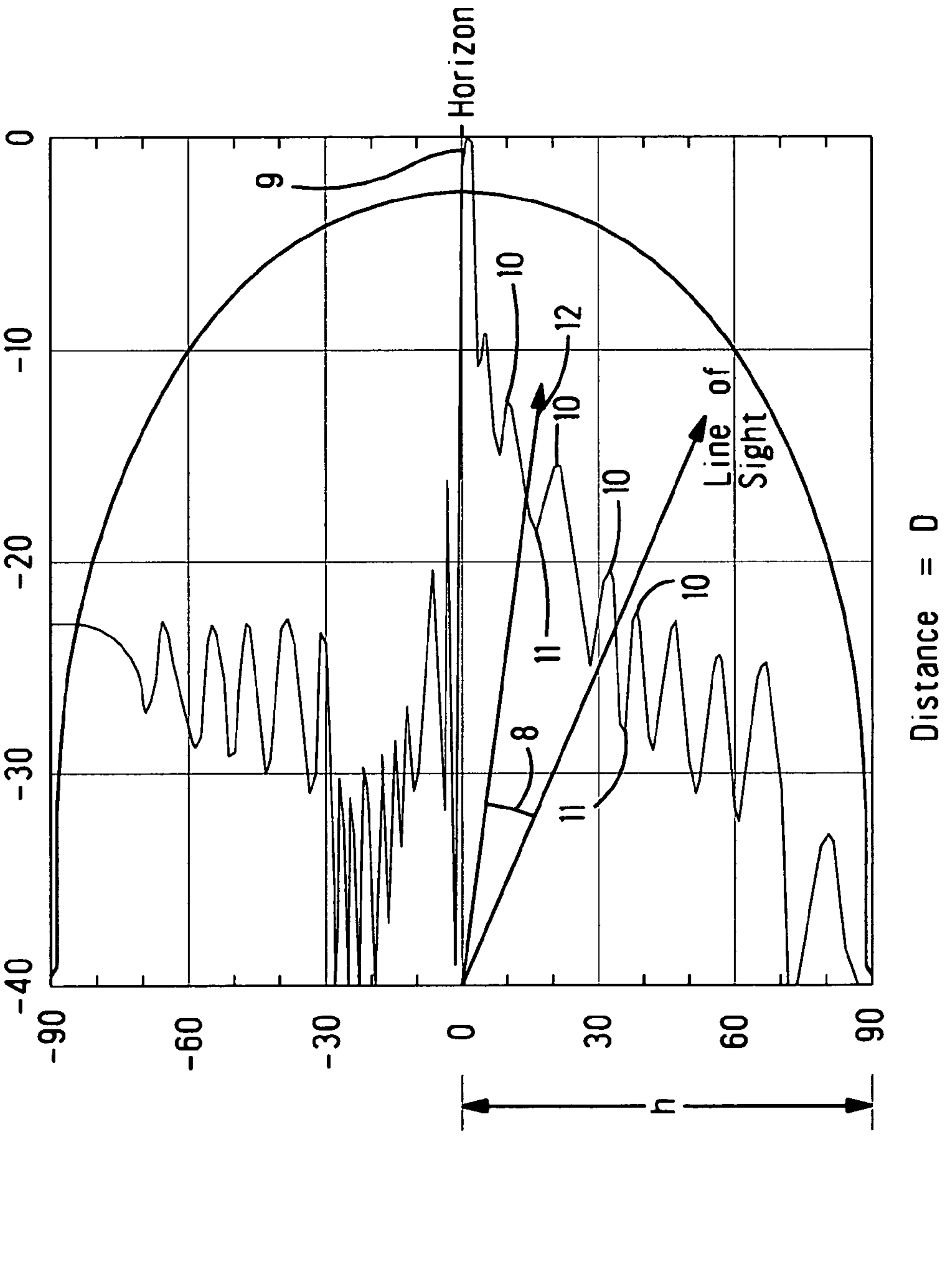
FIG. 6 is a graph of the polar gain pattern of a carrier signal transmitted by an LMDS antenna that is altered to minimize radiated power above the horizon relative to the radiating antenna elements at the top of the altered LMDS antenna.

As shown in FIG. 5 a transmitter having a standard LMDS antenna 1, with its radiating antenna elements at an elevation=h from the earth, has a polar antenna gain pattern with a main lobe 9, of maximum gain, along the horizon at the elevation h. The polar antenna gain pattern extends above the horizon. However, the antenna elevation h is selected to correspond to the highest elevation relative to that of all subscriber locations within the same cell-site. Accordingly, the gain pattern above the horizon represents signal gain that is denied to subscribers 2 and 2*a* that are at lower elevations. According to the invention, the LMDS antenna 1 is altered by the number of radiating antenna elements and the phase angle of carrier signals supplied to the antenna elements to minimize the portion of the gain pattern profile that occurs above the horizon. As shown in FIG. 6 the gain pattern above the horizon is substantially reduced in area bounded by the gain pattern, as compared to that of the gain pattern along and below the horizon. As shown, the reduced area bounded by the gain pattern that is directed above the horizon indicates the extent to which power in the gain pattern has been reduced, which minimizes the signal strength of that portion of the gain pattern that is directed above the horizon, and is denied to the subscribers 2 and 2*a* in the cell-site.

The contour of the polar antenna gain pattern, FIG. 5, that corresponds to a standard LMDS antenna, has multiple side lobes 10, of lesser gain, and relatively deep nulls 11 between the lobes 9 and 10, with the deeper nulls 11 being between the side lobes 10. With the boresight 12 being the line of sight of the antenna elements to a subscriber 2 at an edge of the cell-site, other subscribers 2*a* in the cell-site are located along other angles 8 off the boresight 12. The angles 8 off the boresight 12 are a function of 1/D, the reciprocal of the distance D along the line of sight to the subscriber locations from the radiating elements of the antenna 1. The carrier signals of least gain are provided to subscriber locations along lines of sight at respective angles 8 off the boresight 12 that coincide with respective nulls 11. Minimizing the depths of the nulls 11, will avoid having zones of insufficient signal gain to subscriber locations that have their lines of sight that coincide with the nulls 11 in the radiation pattern. With reference to FIG. 1, due to the depth of the nulls 11 in the radiation pattern of a standard LMDS antenna, insufficient signal gain is likely to occur along the nulls 11. The contour of the polar gain pattern, FIG. 6, that corresponds to reduction of the gain pattern profile that occurs above the horizon, still retains relatively deep nulls 11 between lobes 9 and 10. Thus, subscriber locations risk having their lines of sight to coincide with the relatively deep nulls 11, which are accompanied by insufficient signal gain occurring along the nulls 11. Accordingly, the invention recognizes that the relatively deep nulls 11 are unacceptable in the gain pattern of an LMDS antenna 1 even though the antenna 1 is altered to provide a gain pattern having a minimized profile that occurs above the horizon.

Figure 7:
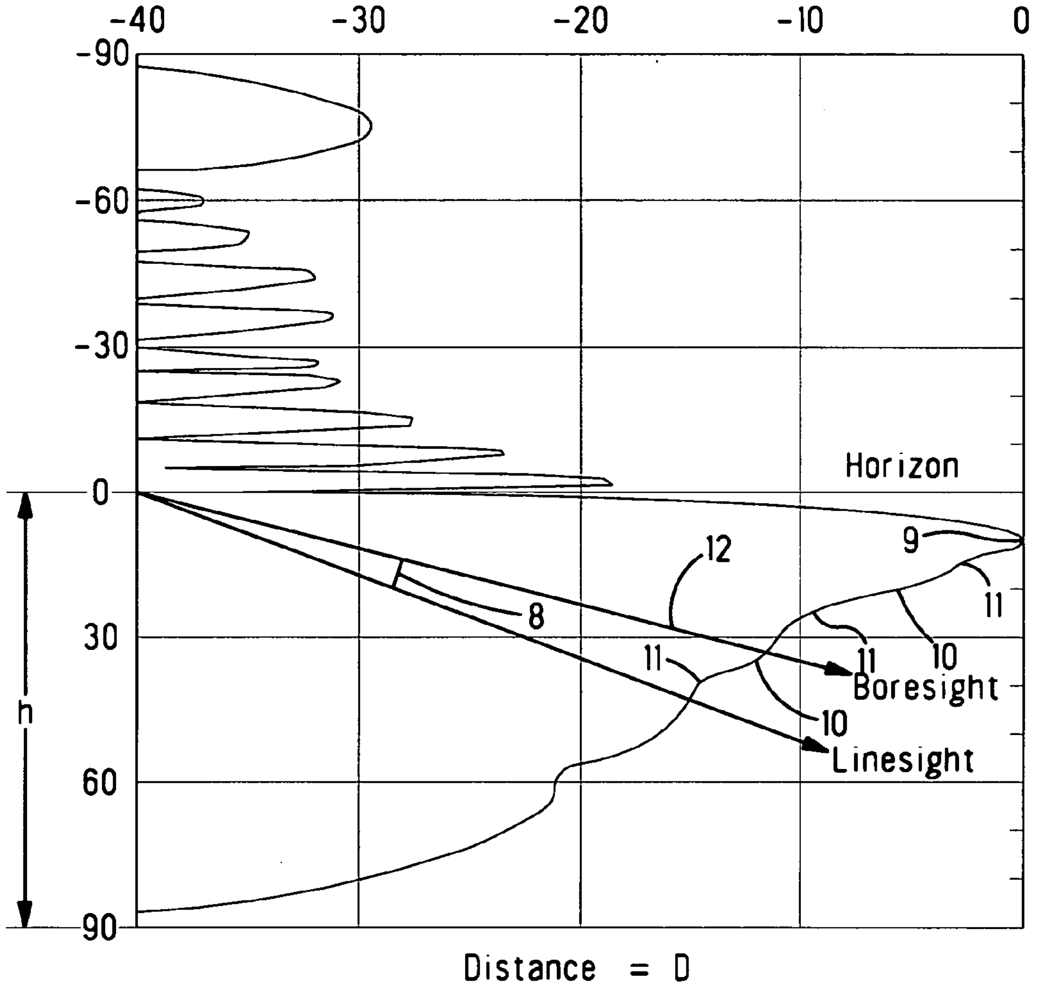
FIG. 7 is a graph of an optimum polar gain pattern of a carrier signal transmitted by an optimum LMDS antenna that is altered to minimize radiated power above the horizon, and to minimize nulls between lobes of the polar gain pattern of the transmitted signal.

With reference to FIG. 7 there is depicted an optimum antenna gain pattern corresponding to an LMDS antenna 1 having twenty nine radiating antenna elements collectively providing the gain pattern. The adjustment of the amplitude and phase angle of the signal to each of the antenna elements will reduce the number and the depths of nulls 11 between lobes 9 and 10, particularly for the nulls 11 between side lobes 10, of the radiation pattern. The ripple like variation in the gain pattern as a function of the angle 8 off boresight 12 is reduced substantially to a smoothed radiation pattern having fewer and shallower zones within the cell site that tend to approach an unacceptable link loss margin. The choice of the number of antenna elements of the LMDS antenna 1, and the phase angle of each of the antenna elements, will result in an optimum antenna 1, the gain pattern of which will substantially counteract the expected path loss. As shown in FIGS. 1 and 3, the gain of the optimum new antenna is depicted by the New Antenna Gain curve 7 that has larger values of dB attenuation at near range, and lesser values of dB attenuation at farther ranges, which counteracts the expected path loss and attenuation due to precipitation. The optimum LMDS antenna 1 minimizes excess signal power, adjacent the peak power 4, being transmitted to nearby subscribers and optimizes transmitted signal power throughout the cell-site to the edge of the cell-site. An improvement of 5 dB to 8 dB impact on the link loss margin is attained to dramatically improve quality of service to the subscribers at the cell edge.

Figure 8:
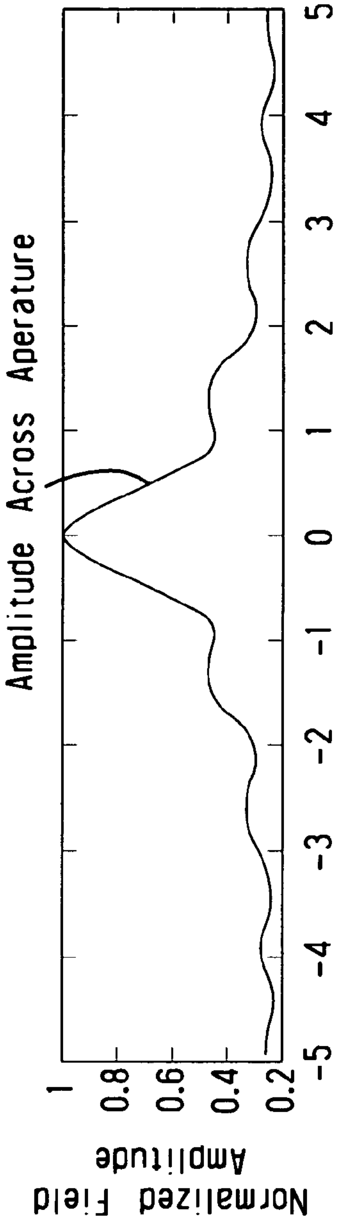
FIG. 8 is a graph depicting distribution of carrier signal amplitude values across the apertures of a multiple apertured, optimum LMDS antenna providing the optimum polar gain pattern of FIG. 7.

With reference to FIG. 8, there is depicted a graph of normalized field amplitude versus phase across aperture to indicate the distribution of relative signal amplitude across each of the apertures of a multiple radiating element LMDS antenna 1, for example, a twenty nine radiating element LMDS antenna 1 of optimum elevation radiation pattern substantially approximating that shown in FIG. 7.

Figure 9:
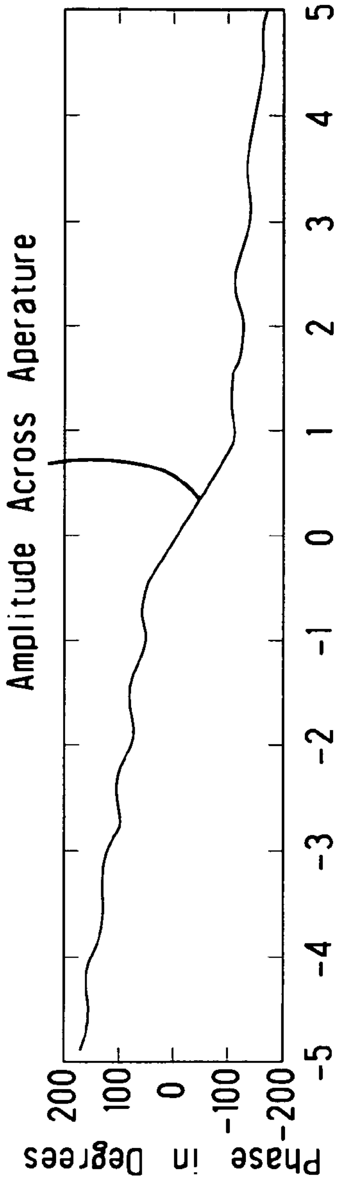
FIG. 9 is a graph depicting distribution of carrier signal phase values across the apertures of a multiple apertured, optimum LMDS antenna providing the optimum polar gain pattern of FIG. 7.

FIG. 9 depicts a graph of phase in degrees versus signal power across aperture to indicate the distribution of relative signal phase across the apertures of a multiple radiating element LMDS antenna 1, for example, a twenty nine radiating element LMDS antenna 1 of optimum elevation radiation pattern substantially approximating that shown in FIG. 7.

Figure 10:
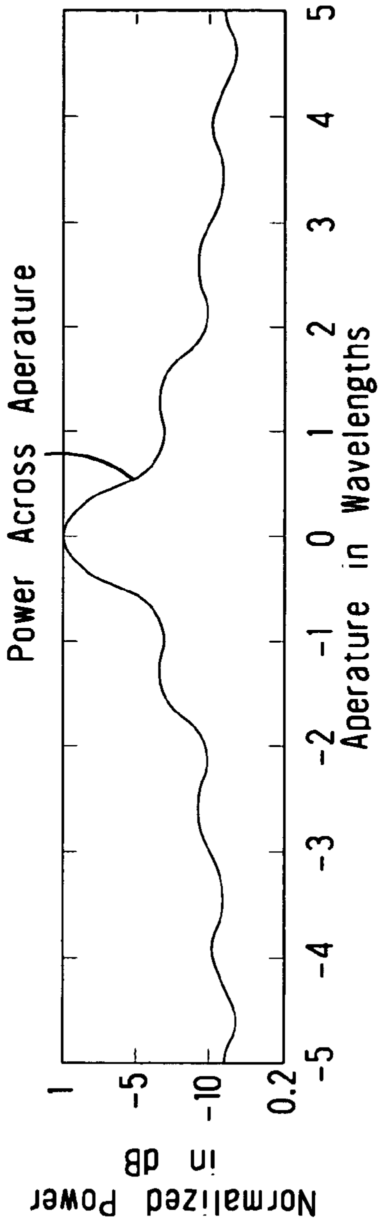
FIG. 10 is a graph depicting distribution of carrier signal power across the apertures of a multiple apertured, optimum LMDS antenna providing the optimum polar gain pattern of FIG. 7.

FIG. 10 depicts normalized power in dB versus aperture in wavelengths to depict the distribution of relative signal power across the apertures of a multiple radiating element LMDS antenna 1, for example, a twenty nine radiating element LMDS antenna 1 of optimum elevation radiation pattern substantially approximating that shown in FIG. 7.

Although an embodiment of the invention has been described, other embodiments and modifications of the invention are intended to be covered by the spirit and scope of the appended claims.

What is claimed is:

1. A local multipoint distribution service system comprising an antenna for transmitting a signal of reused frequency within a specified range from the antenna, the antenna having multiple radiating antenna elements provided with the signal, and a transmitter means for adjusting in phase and in amplitude across the radiating elements to a) mitigate radiation above the horizon; b) decrease attenuation in radiated power with distance from the antenna; and c) mitigate nulls between lobes of combined radiated signals collectively from the antenna elements.

2. A local multipoint distribution service system as recited in claim 1 further comprising the signal being adjusted in phase and in amplitude across the antenna elements to reduce excess signal power at near range.

3. A method of designing an antenna array for a local multipoint distribution service system for transmitting a signal of reused frequency within a specified range from the antenna, the antenna having multiple radiating antenna elements, the method comprising the steps of:

- adjusting the signal provided to each of the antenna elements in phase and in amplitude across the radiating elements to mitigate radiation above horizon; and
- adjusting the signal provided to each of the antenna elements in phase and in amplitude to decrease attenuation in radiated power with distance from the antenna; and
- adjusting the signal provided to each of the antenna elements in phase and in amplitude to mitigate nulls between lobes of combined radiated signals collectively from the antenna elements.

4. A method as recited in claim 3 further comprising the step of:

- adjusting the signal provided to each of the antenna elements in phase and in amplitude across the antenna elements to reduce excess signal power at near range.

* * * * *